2,772,259

ALKALI HYDROPEROXIDES AS OLEFIN POLYMERIZATION CATALYSTS

Hugh J. Hagemeyer, Jr., Kingsport, Tenn., assignor to Eastman Kodak Company, Rochester, N. Y., a corporation of New Jersey No Drawing. Application August 13, 1953, Serial No. 374,147

7 Claims. (Cl. 260—94.9)

This invention relates to a novel process for the manufacture of polymers and interpolymers from olefins. More particularly, this invention relates to the polymerization of ethylene, and the interpolymerization and telomerization of ethylene with one or more compounds.

It is well known that ethylene can be polymerized with the aid of catalysts such as dialkyl dioxides, acyl peroxides, oxygen, Chloramine-T, manganese dioxide, amine oxides, tetraphenyl tin, tetraphenyl lead, tetraethyl lead, butyl lithium, hexachloroethane, sodium perborate, sodium persulfate, potassium chlorate, hydrazine and azo compounds and other typical polymerization catalysts. However, these catalysts have many shortcomings. For instance some catalysts may contaminate the ethylene polymer with an inert inorganic residue which impairs its excellent electrical properties and the heat stability of the ethylene polymer, or it may give an ethylene polymer of limited solubility and melt extrudability. Many of the previously known peroxide catalysts are disadvantageous in that they tend to cause the polymerized material to discolor and to produce polymers with lower average molecular weights. In addition, most of the prior art organic peroxide catalysts are not sufficiently stable at the elevated temperatures required to polymerize ethylene to be used efficiently in an ethylene polymerization process. The most stable form of organic peroxygen compounds is the class known as the hydroperoxides, and particularly that class of hydroperoxide which constitutes an aryl (dialkyl) methyl hydroperoxide. I have now found that the alkali metal salts of the hydroperoxides are particularly advantageous in the polymerization of ethylene and in the preparation of ethylene interpolymers.

Accordingly, it is an object of my invention to provide a novel process for the manufacture of polymers and interpolymers from olefins. Another object is to provide a process for the manufacture of polymers and interpolymers from ethylene. Still another object is to provide a method of making telomers from ethylene and another organic compound. Other objects will become apparent from a consideration of the following description and examples.

According to my invention I realize the above objects by heating ethylene in the presence of an alkali metal or alkaline earth metal salt of a hydroperoxide at temperatures ranging from 100 to 400° C. and pressures from about 100 to 3000 atmospheres (1470 to 44,100 p. s. i.). A more limited temperature range which I have found to be particularly useful is from 100 to 300° C. The conditions of temperature and pressure utilized in my invention have been previously described in U. S. Patent 2,153,553.

One of the outstanding advantages of the alkali metal or alkaline earth metal salts of the hydroperoxides of my invention is that these salts are extremely heat stable with the result that there is negligible decomposition below the elevated temperature required for the polymerization of ethylene. This form of hydroperoxide catalyst is also completely soluble in water, which means that a homogeneous polymerization wherein the monomer and the catalyst are both dissolved in water can be carried out. Thus the catalysts used in accordance with my invention permit homogeneous polymerizations at temperatures higher than those possible with previously known catalysts, thereby resulting in the formation of a more branched chain polymer which has greater flexibility and is particularly desirable for the formation of films. Furthermore, the polymers produced using the alkali metal or alkaline earth metal salts of the hydroperoxides are of considerably higher molecular weight than those prepared using prior art polymerization catalysts under comparable conditions. In addition, the polymers have much less tendency to discolor and are heat stable at elevated temperatures when prepared using the alkali metal or alkaline earth metal salts of the hydroperoxides as catalysts. Still another advantage realized with the catalysts of my invention is the fact that they provide a mildly basic solution without the use of additional buffers or alkali, which is particularly desirable in the homopolymerization of ethylene in the presence of water. The polymers of ethylene obtained according to my invention vary from greases or waxes in the molecular weight range of 1,000 to 6,000 to resinous materials having excellent solubility and melt extrusion characteristics with molecular weights in excess of 6,000. The polymers of ethylene obtained according to my invention are further characterized by having higher softening temperatures than the polyethylene usually obtained according to prior art methods.

The catalysts used in my invention can advantageously be represented by the following general formula:

wherein R represents an alkyl group (e. g. t-butyl, t-amyl, benzyl, etc.) and M represents an alkali metal atom or an alkaline earth metal atom (e. g. sodium, potassium, lithium, calcium, barium, etc.). Especially useful catalysts comprise those represented by the following general formula:

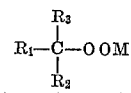

wherein $R_1$ and $R_2$ each represents an alkyl group (e. g. methyl, ethyl, etc.), $R_3$ represents an aryl group such as a mononuclear aryl group of the benzene series (e. g. phenyl, tolyl, p-isopropylphenyl, p-($\alpha,\alpha$-dimethyl-$\alpha$-hydroperoxy methyl) phenyl, etc.), and M has the values given above. The catalysts useful according to my invention can be prepared in the manner described in Dickey et al. U. S. Patent 2,403,709, issued July 9, 1946.

The polymerization of ethylene with an alkali metal or alkaline earth metal salt of a hydroperoxide can be carried out either as a batch, semi-continuous, or continuous operation, in which a suitable reaction vessel is charged with the catalyst and the polymerization medium, and then heated under superatomspheric pressure until the desired degree of polymerization is obtained.

The amount of catalyst employed can be varied, depending on the quantity of material being polymerized, the presence or absence of an inert liquid polymerization medium, temperature, etc. In general, I have found that an amount of catalyst varying from 0.0001 to about 12 percent by weight, based on the total weight of monomers charged to the reaction vessel, can be employed.

The polymerization can be carried out in the presence of inert diluents, such as water, t-butyl alcohol, cumene, toluene, methyl alcohol, n-butyl alcohol, etc., or mixtures of the aforementioned solvents. I have also found that it is sometimes advantageous to employ melted polyethylene itself as a diluent.

Vigorous agitation is generally employed in practicing the polymerization of ethylene according to my invention, since it is thus possible to maintain homogeneous reaction conditions and avoid local overheating. The heat of reaction can be removed by means of external cooling, such methods being previously described in the prior art. The reaction is advantageously carried out in a vessel constructed of or lined with a corrosion resistant material, for example, stainless steel or silver.

The following examples will serve to illustrate more fully the manner whereby I practice the process of my invention.

*Example 1.—Polyethylene wax*

A one-liter stainless steel autoclave was charged with 500 grams of water containing 24 grams of the sodium salt of cumene hydroperoxide. The autoclave was heated to 160–162° C. and pressured with ethylene to 3,600 p. s. i. The polymerization was rapid and complete in 12 minutes and external cooling was required to maintain the reaction temperature in the range 160–162° C. Two hundred and eight grams of a hard white wax, melting point 110° C., density 0.915, iodine No. 8.0, and molecular weight 3,200 was obtained. In a similar run employing cumene hydroperoxide and using 24 grams of catalyst in 500 ml. of methanol, the reaction was carried out at 160° C. and 3,500 p. s. i. One hundred and eighty-five grams of a wax melting at 108° C., density 0.921, iodine No. 5.4, and molecular weight 1,800 was produced.

The above runs are shown for purposes of comparison and the wax obtained using the sodium salt of cumene hydroperoxide was essentially colorless, and in addition to the high molecular weight had a hardness of 1.5–2. The wax obtained using cumene hydroperoxide itself had a molecular weight of only 1,800, was a light tan in color, and had a hardness of 6.5–7.

*Example 2.—Polyethylene wax*

The following runs were made according to the process described in Example 1 using the sodium and potassium salts of cumene hydroperoxide, and the disodium salt of the dihydroperoxide of paradiisopropyl benzene.

| Run | Catalysts | Temp., °C. | Pressure, p. s. i. | Product, g. | M. P., °C. | Density | Iodine No. | Molecular Weight |
|---|---|---|---|---|---|---|---|---|
| A | 17.5 g. Na₂HPDIPB | 160 | 3,900–4,000 | 343 | 110 | 0.918 | 5.4 | 4,400 |
| B | 20.0 g. Na₂HPDIPB | 160 | 3,000–3,800 | 196 | 108 | 0.922 | 6.1 | 4,300 |
| C | 20.0 g. NaCHP | 158 | 3,000–3,800 | 189 | 108 | 0.915 | 3.0 | 3,900 |
| D | 20.0 g. KCHP | 165 | 3,000–3,900 | 206 | 108 | 0.923 | 5.9 | 4,000 |

Na₂HPDIPB = disodium salt of dihydroperoxide of p-diisopropylbenzene.
CHP = cumene hydroperoxide.

*Example 3.—Polyethylene resin*

A one-liter stainless steel pressure reactor was flushed with ethylene and charged with 5 grams of sodium cumene hydroperoxide in 200 grams of methanol. The reactor was charged with ethylene to a pressure of 300 atmospheres and heated to 160° C. Upon reaching this temperature, the ethylene pressure was raised to 1,000 atmospheres and the polymerization was allowed to proceed with agitation for a 24-hour period. As the ethylene polymerized the pressure was maintained at 900 to 1,000 atmospheres pressure by the addition of more ethylene. There was obtained 342 parts of a white solid ethylene polymer with a molecular weight of 28,000. The ethylene polymer obtained in this fashion was very tough and had a tensile strength of 3,200 pounds per square inch at 600% elongation, and was soluble to the extent of at least 40% by weight in xylene at 100° C.

*Example 4.—Polyethylene wax*

The reactor of Example 1 was charged with 15 grams of the potassium salt of p-tertiary butyl dimethyl benzyl hydroperoxide dissolved in 500 ml. of an 80/20 methanol/water solution. The autoclave was purged and charged with ethylene to 1000 p. s. i. After heating to 145° C. the pressure was raised to 4,500 p. s. i. and maintained by the addition of ethylene as required. Four hundred and seventy-five grams of a white, hard wax was obtained. Methanol, water, and dissolved ethylene were removed by passing nitrogen through a wax melt. The final product had a density of 0.938, M. P. 103–4° C., and a molecular weight of 4,300.

*Example 5.—Polyethylene resin*

Five grams of the dilithium salt of the dihydroperoxide of p-diisopropyl benzene was suspended in 200 grams of molten polyethylene (molecular weight 7,400), 130° C., and charged to a one-liter stainless steel autoclave. Ethylene was pressed in at 8,000–9,000 p. s. i. while maintaining a reaction temperature of 145° C. by cooling. The product yield was 612 grams of polyethylene with a molecular weight of 9,200. This included the 200 grams of beginning polyethylene.

*Example 6.—Eethylene-styrene interpolymer*

Two hundred and eight grams of styrene, 300 grams of butanol, and 50 grams of water containing 4 grams of the Na salt of cumene hydroperoxide were charged to a one-liter stainless steel autoclave. The autoclave was purged and charged to 3,000 p. s. i. with ethylene and heated to 175° C. The pressure was raised to 9,000 p. s. i. with ethylene and was maintained there by the addition of ethylene as required.

The reaction was stopped at the end of 6 hours and 373 grams of ethylene-styrene interpolymer was obtained, composition $(C_2H_4)_3(C_6H_5CH=CH_2)$ (molar ratio).

In a manner similar to that illustrated in the above examples, other polymerizable compounds can be polymerized according to my invention. For example, compounds containing monoethylenic unsaturation, i. e. compounds having the following group —CH=C< can be advantageously employed in place of the ethylene illustrated in the above examples. Further, the styrene employed in Example 6 can be replaced with other polymerizable compounds. In addition to the ethylene and styrene illustrated, other compounds which can be employed in practicing my invention comprise acrylonitrile, methacrylonitrile, α-methyl styrene, methyl vinyl ketone, methyl isopropenyl ketone, vinyl pyridine, vinyl pyrrolidone, acrylic acid, methacrylic acid, methyl acrylate, methyl methacrylate, ethyl acrylate, ethyl methacrylate, acrylamide, methacrylamide, M-methylacrylamide, M-methylmethacrylamide, etc. Also, diolefins such as butadiene, isoprene, etc. can be employed. As noted above, the catalysts of my invention can also be employed in telomerization processes wherein ethylene is employed, such as is illustrated in Hanford et al. U. S. Patent 2,402,137, issued June 18, 1946.

What I claim as my invention and desire secured by Letters Patent of the United States is:

1. A process which comprises heating ethylene in the presence of a catalyst selected from those represented by the following general formula:

$$\begin{array}{c} R_3 \\ | \\ R_1-C-OOM \\ | \\ R_2 \end{array}$$

wherein $R_1$ and $R_2$ each represents an alkyl group of from 1 to 2 carbon atoms, $R_3$ represents a mononuclear aromatic group of the benzene series, and M represents an alkali metal atom, at a temperature of from about 145–175° C. and a pressure of about 200 to 1,000 atmospheres.

2. A process according to claim 1 wherein the process is carried out in the presence of an inert organic solvent.

3. A process according to claim 1 wherein the process is carried out in the presence of water.

4. A process which comprises heating ethylene in the presence of the sodium salt of cumene hydroperoxide at a temperature of from about 145–175° C. and a pressure of about 200 to 1,000 atmospheres.

5. A process which comprises heating ethylene in the presence of the potassium salt of cumene hydroperoxide at a temperature of from about 145–175° C. and a pressure of about 200 to 1,000 atmospheres.

6. A process which comprises heating ethylene in the presence of the disodium salt of the dihydroperoxide of p-diisopropylbenzene at a temperature of from about 145–175° C. and a pressure of about 200 to 1,000 atmospheres.

7. A process which comprises heating ethylene in the presence of the dilithium salt of the dihydroperoxide of p-diisopropylbenzene at a temperature of from about 145–175° C. and a pressure of about 200 to 1,000 atmospheres.

References Cited in the file of this patent

UNITED STATES PATENTS

| | | |
|---|---|---|
| 2,450,451 | Schmerling | Oct. 5, 1948 |
| 2,462,680 | Sargent | Feb. 22, 1949 |

FOREIGN PATENTS

| | | |
|---|---|---|
| 610,293 | Great Britain | Oct. 13, 1948 |